May 1, 1923. 1,453,589
R. LIEBAU
AIR SPRING SUSPENSION
Filed Feb. 26, 1919 2 Sheets-Sheet 1
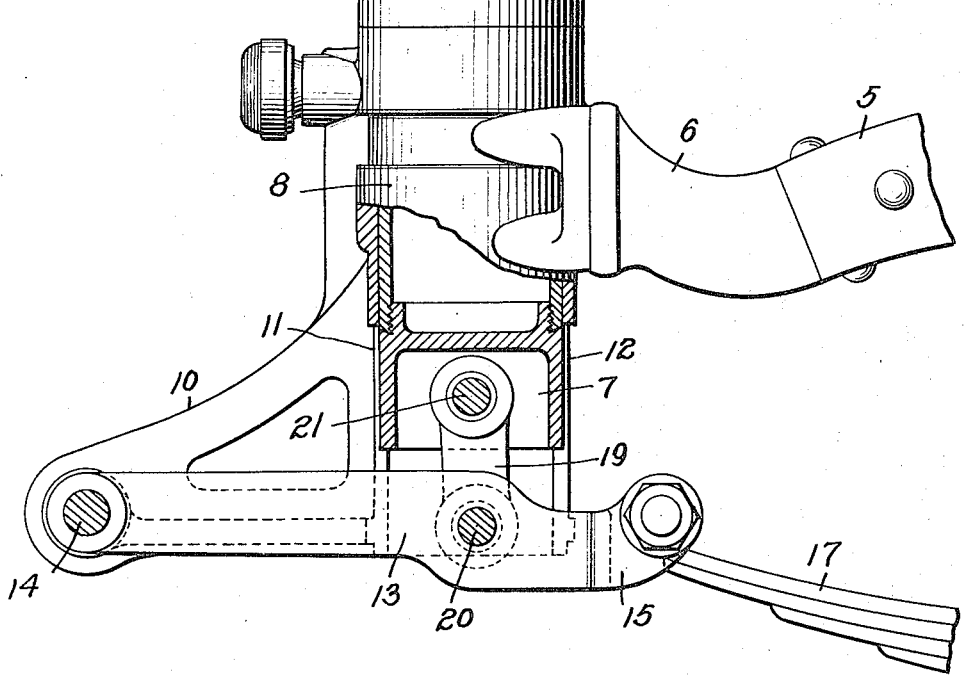

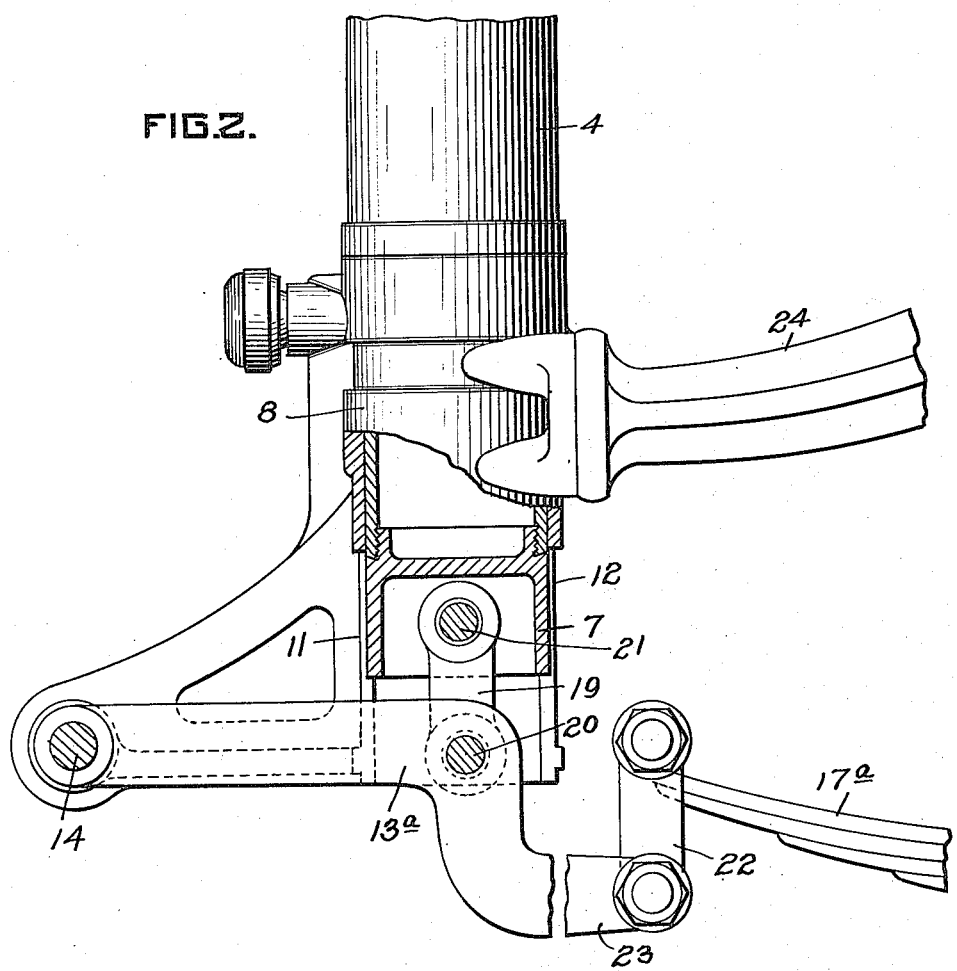
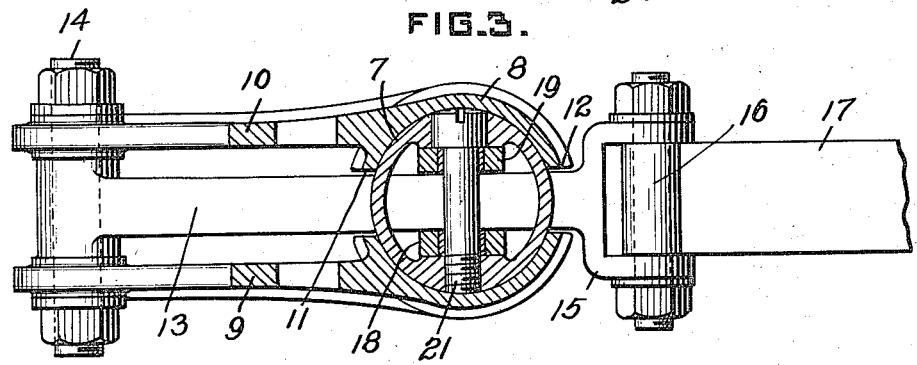

Patented May 1, 1923.

1,453,589

UNITED STATES PATENT OFFICE.

RICHARD LIEBAU, OF NEW HAVEN, CONNECTICUT, ASSIGNOR TO THE WESTINGHOUSE AIR SPRING COMPANY, A CORPORATION OF PENNSYLVANIA.

AIR-SPRING SUSPENSION.

Application filed February 26, 1919. Serial No. 279,428.

*To all whom it may concern:*

Be it known that I, RICHARD LIEBAU, a citizen of the United States, and a resident of New Haven, in the county of New Haven and State of Connecticut, have made a new and useful Invention in Air-Spring Suspensions, of which the following is a specification.

This invention relates to vehicle springs and more particularly to means for mounting and connecting up one element of a telescope air spring or cushion device to the steel spring of a vehicle in such a way that the cushion device will work in series with the steel spring and the strains due to twisting of the steel spring and also due to the relative movement between the running gear and load platform will not be transmitted to the cushion device.

In the drawings, Figure 1 is a side view partially in elevation and partially in section of a device embodying this invention and shows the construction of one of the devices when used upon the front of the vehicle.

Fig. 2 is a fragmentary view partially in elevation and partially in section of the device shown in Fig. 1 but slightly modified so as to be capable of use in the rear of the vehicle and Fig. 3 is a plan view with a portion of the device of Fig. 1 shown partially in cross section.

In the drawings one element 4 of a vehicle air spring is attached to the forward end 5 of the frame of a vehicle by means of an extension bracket 6. The air spring in its elemental form consists of an outer cylindrical member which may be 4 within which a cylindrical member 7 is arranged to telescope. Cylindrical member 4 is secured within a guard portion 8 and this guard portion is provided with two forwardly extending arms 9 and 10.

The guard portion at its bottom has its front and rear portions slotted as shown at 11 and 12 and within the slots a lever arm 13 is adapted to play. The lever at its forward end is connected to a pin 14 secured in the enlarged forward ends of arms 9 and 10. The rear of the lever 13 is bifurcated as shown at 15 so as to straddle the eye 16 of leaf spring 17. The bottom of cylindrical member 7 is connected to lever 13 by means of two shackle links 18 and 19 which are connected to the lever by a pin 20 and to the cylinder bottom by a pin 21.

With this construction as shown in Figs. 1 and 3 all of the pulling strain is removed from the sliding member 7 of the air spring since cross pin 14 carries the entire pulling strain.

When the device is used on the rear of the vehicle as shown in Fig. 2 lever arm 13$^a$ which takes the place of lever arm 13 is bent downwardly as shown in this view so as to lie under the rear end of steel spring 17$^a$ to the spring eye of which it is connected by means of a shackle 22. In order to accommodate the overhang of the body the lower portion 23 of lever 13$^a$ may be lengthened out to accommodate the overhang and bracket 24 will correspondingly be made to accommodate the overhang.

Having thus described my invention what I claim is—

1. In combination with the load platform and the steel springs of a vehicle, an air spring comprising two telescopic members, the outer of which is slotted, means for rigidly securing the outer of said members to the load platform, a bracket rigidly secured to the outer member, a lever pivotally secured to said bracket and movable through said slot, and to the steel spring of the vehicle, and a shackle pivotally connected to the other member of the air spring and pivotally connected to said lever.

2. In combination with the load platform and steel springs of a vehicle, an air spring comprising two relatively movable telescoping members, the outer of which is longitudinally slotted, a bracket rigidly secured to one of said members and to the load platform, a second bracket rigidly secured to the other side of said member, a lever fulcrumed at one end on said second bracket, pivotally secured at the other to a steel spring of the vehicle and movable vertically within said slot, and a shackle pivotally connected to the other member and to an intermediate point of said lever.

In testimony whereof, I have hereunto subscribed my name this 2nd day of December, 1918.

RICHARD LIEBAU.